US008733542B2

(12) United States Patent
Yamaoka

(10) Patent No.: US 8,733,542 B2
(45) Date of Patent: May 27, 2014

(54) BELT SKEW CORRECTING DEVICE, BELT DEVICE, AND IMAGE FORMING APPARATUS

(75) Inventor: Hironori Yamaoka, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 40 days.

(21) Appl. No.: 13/422,276

(22) Filed: Mar. 16, 2012

(65) Prior Publication Data

US 2012/0234656 A1 Sep. 20, 2012

(30) Foreign Application Priority Data

Mar. 18, 2011 (JP) ................................ 2011-060847

(51) Int. Cl.
*B65G 39/16* (2006.01)

(52) U.S. Cl.
USPC .......................................... 198/806; 399/328

(58) Field of Classification Search
USPC .......................................................... 198/806
See application file for complete search history.

(56) References Cited

U.S. PATENT DOCUMENTS 3,973,446 A * 8/1976 Vasilantone .................. 474/107
4,462,676 A * 7/1984 Shimura et al. ............... 399/165
5,170,968 A * 12/1992 Helmner .................... 244/137.1
5,471,289 A * 11/1995 Satoh et al. ................... 399/328
6,078,766 A * 6/2000 Kurotaka ...................... 399/165
7,416,074 B2 * 8/2008 Otomo et al. ............ 198/810.03
7,565,095 B2 * 7/2009 Mori ............................ 399/165
7,810,633 B2 * 10/2010 Okamoto et al. ............. 198/806

FOREIGN PATENT DOCUMENTS

JP 2006162659 A 6/2006
JP 2009186910 A 8/2009
JP 2010019899 A 1/2010

OTHER PUBLICATIONS

Abstract of JP 2010-019899 published Jan. 28, 2010.
Abstract of JP 2009-186910 published Aug. 20, 2009.
Abstract of JP 2006-162659 published Jun. 22, 2006.

* cited by examiner

*Primary Examiner* — Ramya Burgess
*Assistant Examiner* — Thomas Randazzo
(74) *Attorney, Agent, or Firm* — Harness, Dickey & Pierce, P.L.C.

(57) ABSTRACT

A belt skew correcting device corrects a deviation of an endless belt which is supported by a plurality of rollers and which is driven to rotate around the plurality of rollers. An inclined sectional surface of a dislocating member is guided by an inclined sectional surface of a guide member in accordance with a following movement of a following member, so that a rotational shaft of one roller is given a tilt corresponding to an amount of the movement of the endless belt along the rotational shaft, and thereby the one roller can be tiled.

20 Claims, 9 Drawing Sheets

BELT SKEW CORRECTING DEVICE, BELT DEVICE, AND IMAGE FORMING APPARATUS

CROSS-REFERENCE TO RELATED APPLICATIONS

The present application claims priority to and incorporates by reference the entire contents of Japanese Patent Application No. 2011-060847 filed in Japan on Mar. 18, 2011.

BACKGROUND OF THE INVENTION

1. Field of the Invention

The present invention relates to a belt skew correcting device used for a belt carrying device including an endless belt, a belt device including the belt skew correcting device, and an image forming apparatus including these devices.

2. Description of the Related Art

Conventionally, an image forming apparatus incorporates various types of endless-shaped belts (hereinafter, referred to as endless belts) as a latent image carrying body, an intermediate transfer body, a recording medium conveying member, an image fixing member, and the like. Such a kind of belt is configured to move in a constant direction while being stretched across at least supporting two rollers.

There is a problem generally called "belt skew" in that an endless belt skews or deviates in a direction orthogonal to the conveyed direction of the endless belt. Such a belt skew is caused for example by a problem in materials of the endless belt or components related thereto, processing accuracy for the endless belt and the components, or aging degradation of the components, and the like. If the belt skew occurs, for example, a positional deviation occurs in an image transferred onto a recording medium such as a recording sheet, or the endless belt comes off from a supporting roller and is broken. Therefore, it is necessary to suppress an occurrence of belt skew and to correct the belt skew if it occurs.

Conventionally, various methods have been proposed in order to suppress or correct, if occurred, the belt skew. For example, Japanese Patent Application Laid-open No. 2006-162659 discloses a configuration of a belt skew correcting mechanism. In this configuration, an endless belt is supported by a plurality of rollers, and one of the rollers (supporting roller) is arranged to be tiltable. For this purpose, a shaft of this supporting roller, which rotatably supports the same, has one end which is tiltably supported with respect to the other end thereof serving as a pivotal point. Between the tiltable end of the roller shaft and the supporting roller, the shaft of the supporting roller (roller shaft) is provided with a following member that follows a movement of the endless belt along the shaft due to the belt skew. Between the tiltable end and the following member, there is provided a displacement member which is configured separately from the following member and which tilts the one end of the roller shaft in accordance with the following movement of the following member along the roller shaft. The following member is a pulley member which engages a bead arranged at one end of the endless belt. And, the following member is rotatable around the roller shaft, and is movable along the roller shaft following to the skew of the endless belt. The dislocating member, to which the shaft of the supporting roller (roller shaft) is inserted, is provided with a plate portion which has an elongate hole for regulating the movement of the inserted roller shaft only in the tilting direction, a projecting portion along which the following member slides, and an engaging portion which engages a pivotal shaft arranged fixedly at the device body.

The pivotal shaft arranged fixedly is spaced from the shaft of the supporting roller with a predetermined angle with respect to the shaft of the supporting roller, so that the displacement member can rotate around the pivotal shaft. If the endless belt skews or deviates toward the tiltable end of the roller shaft, the projecting portion of the displacement member is pressed by the following member, and the portion of the roller shaft which is supported by the elongate hole rotates around the pivotal shaft so as to move substantially upward. On the other hand, if the endless belt skews or deviates toward the other end of the roller shaft (the pivotal end of the roller shaft), the portion of the roller shaft which is supported by the elongate hole presses the following member because of the own weight of the supporting roller, and rotates around the pivotal shaft so as to move substantially downward. Since the displacement member rotates (moves pivotally) in accordance with the skew of the endless belt, the roller shaft tilts by an angle in accordance with the skew of the endless belt with respect to the pivotal end thereof. While the endless belt rotates, a force is generated from a friction among the endless belt, the supporting roller and the following member. Due to this force from the friction, the angle of the roller shaft is converged to an angle when the belt skew does not occur, so that the belt skew is corrected. This convergence makes it possible to suppress and correct, if occurs, the belt skew.

Japanese Patent Application Laid-open No. 2009-186910 discloses a configuration of a belt skew correcting mechanism. In this configuration, an endless belt is supported by a plurality of rollers, and one of the rollers (supporting roller) is arranged to be tiltable. For this purpose, a shaft of this supporting roller, which rotatably supports the same, has one end which is tiltably supported with respect to the other end thereof serving as a pivotal point. Between the tiltable end of the roller shaft and the supporting roller, the shaft of the supporting roller (roller shaft) is provided with a following member that follows a movement of the endless belt along the shaft due to the belt skew. At an end of the following member which is an end not facing the supporting roller, there is provided a displacement member which is configured integrally with the following member and which tilts the one end of the roller shaft in accordance with the following movement of the following member along the roller shaft. The following member is a member provided with a cylinder-shaped portion onto which one end of the endless belt is mounted, and a flange portion which abuts on the one end of the endless belt. The following member rotates in accordance with the rotation of the endless belt, and can moves along the roller shaft following to the skew of the endless belt. The displacing member is configured integrally with the following member via a bearing, and is supported movably with respect to the roller shaft along the same. A part of the displacing member is formed to be conical shape having a smaller diameter at the following member side thereof. The displacing member is disposed at a position far from the endless belt than the following member, and is always pressed toward the endless belt by a pressing member. A guide member having a cylindrical shape substantially vertical with respect to the roller shaft and having a substantially horizontal central axis abuts on the conical part of the displacing member from the lower side.

If the endless belt skews or deviates toward the vertically movable end of the roller shaft, the conical part of the displacing member which is integrally with the following member is guided in such a manner that the conical part slides down from the guide member due to the own weight of the supporting roller and the like. Thus, the conical part moves toward vertically movable end of the roller shaft. Since the conical part moves as described above, a vertical position of the roller shaft where the guide member supports the shaft is lowered, so that the supporting roller tilts downward. On the other hand, if the endless belt skews or deviates toward the pivotal end of the roller shaft, the conical part of the displacing member which is integrally with the following member is pressed by the pressing member and guided by the guide member in such a manner that the conical part slides up from the guide member. Thus, the conical part moves toward the pivotal end of the roller shaft. Since the conical part moves as described above, the vertical position of the roller shaft where the guide member supports the shaft is raised, so that the supporting roller tilts upward. Thus, since the displacing member is guided by the guide member in accordance with the skew of the endless belt, the roller shaft tilts with respect to the other end serving as the pivotal point with an angle corresponding to the skew of the endless belt. While the endless belt rotates, a force is generated from a friction among the endless belt, the supporting roller and the following member. Due to this force from the friction, the angle of the roller shaft is converged to an angle when the belt skew does not occur, so that the belt skew is corrected. This convergence makes it possible to suppress and correct, if occurs, the belt skew.

In the configuration disclosed in Japanese Patent Application Laid-open No. 2006-162659, however, a backlash may occur because of uneven abrasion between the roller shaft and an inner peripheral surface of the displacing member which engages the roller shaft, or between the elongate hole which supports the roller shaft and the roller shaft which slidably moves along the elongate hole. If the backlash occurs at these parts, the conversion may become stepwise when the roller shaft converges to a status with no belt skew, or the conversion itself may become impossible. Furthermore, if the status that the roller shaft cannot converge to a status with no belt skew continues for a long time, a positional deviation of a transfer image on a recording medium such as recording paper or the like may occur, or the endless belt may be damaged because of the detachment of the belt from the supporting roller. If the abrasion is advanced at these parts, the normal skew correction is likely to be impossible, and the durability as the belt skew correcting mechanism becomes unsure. Thus, the configuration disclosed by Japanese Patent Application Laid-open No. 2006-162659 still has a problem in the stable belt skew correction and the durability thereof.

On the other hand, in the configuration disclosed by Japanese Patent Application Laid-open No. 2009-186910, the cylinder shaped guide member, of which central axis is substantially horizontal and which is disposed substantially vertical to the roller shaft, abuts on the conical part of the displacing member. Thereby, the abutting position is a point, and the backlash may occur because of uneven abrasion. Therefore, the configuration disclosed by Japanese Patent Application Laid-open No. 2009-186910 still has a problem in the stable belt skew correction and the durability thereof, similarly to Japanese Patent Application Laid-open No. 2006-162659.

SUMMARY OF THE INVENTION

It is an object of the present invention to at least partially solve the problems in the conventional technology.

A belt skew correcting device corrects a skew of an endless belt which is supported by a plurality of rollers and which is driven to rotate around the plurality of rollers. The device is provided with a following member that follows a movement of the endless belt along an rotational shaft of one of the plurality of rollers and also follows a rotational movement of the endless belt around the rotational shaft, a dislocating member that is configured integrally with the following member in order to follow the movement of the endless belt along the rotational shaft and not to follow the rotational movement of the endless belt around the rotational shaft, and a guide member that guides the dislocating member. The dislocating member has a cylindrical shape, a part of which is cut off diagonally so that the dislocating member has an inclined sectional surface. The guide member has a cylindrical shape, a part of which is cut off diagonally so that the guide member has an inclined sectional surface to abut slidably on the inclined sectional surface of the dislocating member. An angle of the inclined sectional surface of the dislocating member with respect to the rotational shaft is the same as an angle of the inclined sectional surface of the guide member with respect to the rotational shaft. The inclined sectional surface of the dislocating member is guided by the inclined sectional surface of the guide member in accordance with a following movement of the following member, so that the rotational shaft is given a tilt corresponding to an amount of the movement of the endless belt along the rotational shaft, and thereby the one roller can be tiled.

A belt device includes an endless belt and the aforementioned belt skew correcting device.

An image forming apparatus includes the aforementioned belt skew correcting device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
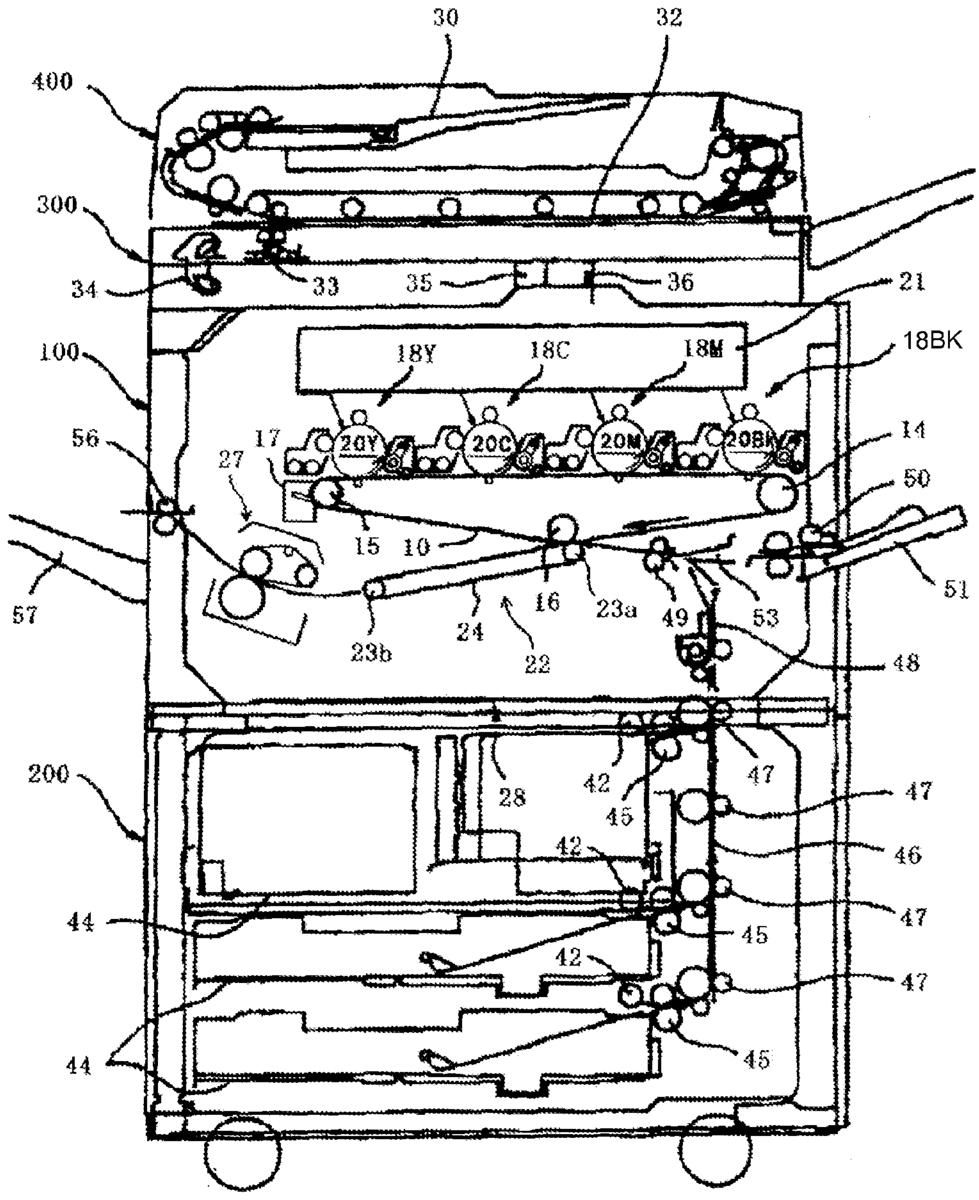
FIG. 1 is a schematic of an entire configuration of an image forming apparatus according to an embodiment.
Figure 2:
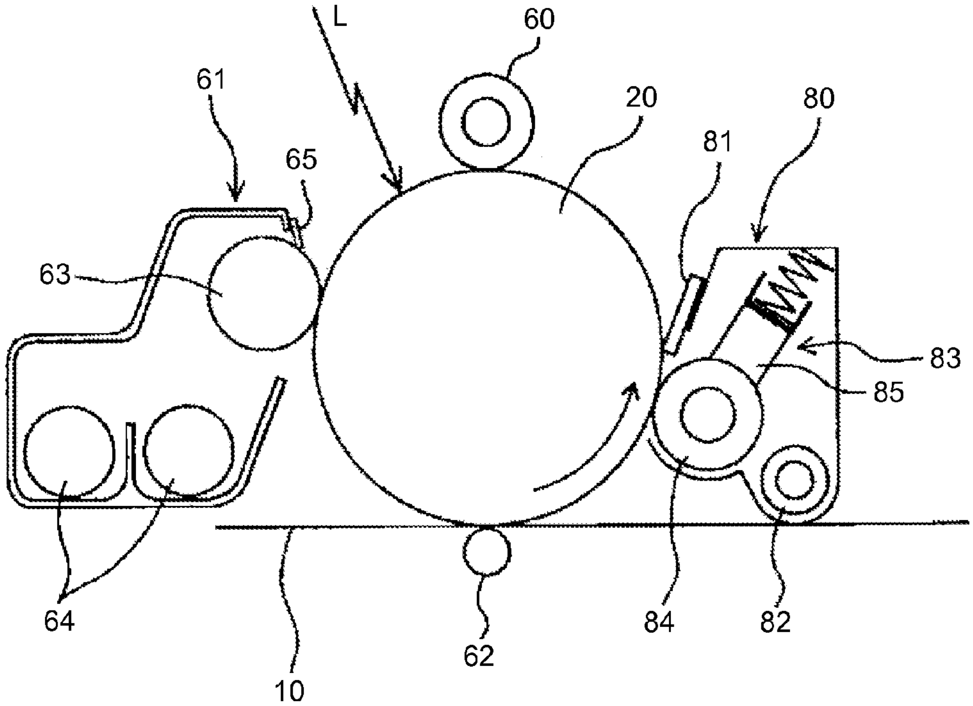
FIG. 2 is a view for explaining an image forming unit according to the embodiment.

Exemplary embodiments in which the present invention is applied to a color multifunction product (MFP) serving as an electrophotographic image forming apparatus are described with reference to the accompanying drawings. FIG. 1 is a schematic view of an entire configuration of an image forming apparatus according to the present embodiment. FIG. 2 is a view for explaining an image forming unit according to the present embodiment.

An outline of the MFP in the present embodiment will now be described. The MFP includes an MFP main body 100, a paper feeding table 200 on which the MFP main body is placed, a scanner 300 mounted on the MFP main body, and an automatic document feeder (ADF) 400 mounted on top of the scanner. The MFP in the present embodiment is a so-called tandem-type color image forming apparatus including an intermediate transfer belt.

The MFP main body 100 includes an intermediate transfer belt 10. The intermediate transfer belt 10 is stretched across supporting rollers 14, 15, and 16 serving as three supporting members, and is driven to rotate in the clockwise direction in FIG. 1. Four image forming units 18Y, 18C, 18M, and 18BK for yellow, cyan, magenta, and black, respectively, are arranged in an aligned manner on the portion of the belt extended between the first supporting roller 14 and the second supporting roller 15 among the supporting rollers. An exposing unit 21 is arranged above the image forming units 18Y, 18C, 18M, and 18BK. The exposing unit 21 forms an electrostatic latent image on photosensitive elements 20Y, 20C, 20M, and 20BK of the image forming units, respectively, on the basis of image information read by the scanner 300 from an original or print information transmitted from a personal computer or the like.

A secondary transfer device 22 is arranged at a position facing the third supporting roller 16 among the supporting rollers. In the secondary transfer device 22, a secondary transfer belt 24 in an endless belt-shape, which is a transfer member serving as a surface moving member, is stretched across two rollers 23*a* and 23*b*. To secondarily transfer a toner image on the intermediate transfer belt 10 onto a transfer sheet serving as a recording material, the secondary transfer belt 24 is pressed against the intermediate transfer belt 10 wound around the third supporting roller 16, whereby secondary transfer is performed. The secondary transfer device 22 does not necessarily use the secondary transfer belt 24. Alternatively, the secondary transfer device 22 may use a transfer roller, and convey the transfer sheet to a fixing device 27 by a transfer material conveying belt arranged downstream of the transfer roller in a transfer-sheet conveyance direction, for example. A belt cleaning device 17 including a cleaning blade is arranged at a position facing the second supporting roller 15 among the supporting rollers of the intermediate transfer belt 10. The belt cleaning device 17 removes residual toner remaining on the intermediate transfer belt 10 after the toner image on the intermediate transfer belt 10 is transferred onto the transfer sheet. The MFP main body 100 also includes the fixing device 27 that fixes, on the transfer sheet, the toner image transferred onto the transfer sheet.

The configuration of the image forming units 18Y, 18C, 18M, and 18BK will now be described. Because the image forming units 18Y, 18C, 18M, and 18BK have the same configuration except for using toner in different colors, the reference numerals of Y, C, M, and BK will be omitted appropriately in the description below. Furthermore, the image forming unit 18 may be a process cartridge that includes at least the photosensitive element 20 and a lubricant applying unit, which will be described later, and all or a part of other component parts and component devices, and that is attachable to and detachable from the MFP main body 100.

As illustrated in FIG. 2, a charging unit 60, a developing unit 61, and a photosensitive element cleaning device 80, and the like are arranged around the photosensitive element 20 in the image forming unit 18. Furthermore, a primary transfer device 62 is arranged at a position facing the photosensitive element 20 with the intermediate transfer belt 10 interposed therebetween.

The charging unit 60 is a contact charging unit that employs a charging roller. The charging unit 60 comes into contact with the photosensitive element 20 to apply a voltage, thereby uniformly charging the surface of the photosensitive element 20.

While the developing unit 61 may use a one-component developer, the developing unit 61 in the present embodiment uses a two-component developer (hereinafter, simply referred to as a "developer") composed of a magnetic carrier and nonmagnetic toner. Toner in each color used in the present embodiment is made of a resin material colored in each color. In the developing unit 61, the developer is conveyed to circulate while being stirred by two screws 64, and is supplied to a developing roller 63. The developer supplied to the developing roller 63 is lifted and held by a magnet. The developer lifted by the developing roller 63 is conveyed in association with a rotation of the developing roller 63, and is regulated to a proper amount by a doctor blade 65. The developer thus regulated is then returned to the inside of the developing unit. The developer conveyed to a developing area facing the photosensitive element 20 in this manner rises because of magnetic force of the magnet so that a magnetic brush is formed. In the developing area, a developing bias applied to the developing roller 63 forms a developing electric field that moves the toner in the developer to the portion of the electrostatic latent image on the photosensitive element 20. Thus, the toner in the developer is transferred to the portion of the electrostatic latent image on the photosensitive element 20, and the electrostatic latent image on the photosensitive element 20 is developed into a toner image. The developer after passing through the developing area is conveyed to an area in which the magnetic force of the magnet is weak. As a result, the developer is removed from the developing roller 63, and is returned to the inside of the developing unit 61. If the toner concentration inside the developing unit 61 becomes low by repeating such operations, a toner concentration sensor (not illustrated) detects it. On the basis of the detection result, a toner supplying unit (not illustrated) supplies toner to the inside of the developing unit.

The primary transfer device 62 employs a primary transfer roller, and is arranged so as to be pressed against the photosensitive element 20 with the intermediate transfer belt 10 interposed therebetween.

The photosensitive element cleaning device 80 is arranged with a tip of a cleaning blade 81 made of a polyurethane rubber pressed against the surface of the photosensitive element 20. The toner removed from the photosensitive element 20 by the cleaning blade 81 is housed in the photosensitive element cleaning device 80. The toner thus housed is then conveyed to a waste toner container (not illustrated) by a toner conveying coil 82 arranged inside the photosensitive element cleaning device 80. Furthermore, the photosensitive element cleaning device 80 in the present embodiment also includes a lubricant applying unit 83. The lubricant applying unit 83 presses a solid lubricant 85 against a lubricant applying brush 84, thereby applying the lubricant to the surface of the photosensitive element 20. The cleaning blade 81 also serves as a leveling member that levels out the lubricant applied by the lubricant applying unit 83 on the surface of the photosensitive element 20. Therefore, the cleaning blade 81 comes into contact with the surface of the photosensitive element 20 in a counter manner.

In the image forming unit 18 having the configuration described above, the charging unit 60 uniformly charges the surface of the photosensitive element 20 in association with the rotation of the photosensitive element 20. Subsequently, the exposing unit 21 irradiates the photosensitive element 20 with writing light L such as a laser, a light-emitting diode (LED), or the like on the basis of the image information read by the scanner 300 and the print information transmitted from a personal computer or the like. The exposing unit 21 then forms an electrostatic latent image on the photosensitive element 20. Then, the developing unit 61 develops the electrostatic latent image into a visible toner image. The toner image is primarily transferred onto the intermediate transfer belt 10 by the primary transfer device 62. The photosensitive element cleaning device 80 removes transfer residual toner remaining on the surface of the photosensitive element 20 after the primary transfer. The surface of the photosensitive element 20 is then used for subsequent image forming.

A copying operation performed by the MFP in the present embodiment will now be described. To copy an original by using the MFP having the configuration described above, the original is set on a platen 30 of the ADF 400 first. Alternatively, the ADF 400 is opened to set the original on an exposure glass 32 of the scanner 300, and then the ADF 400 is closed to press the original. Subsequently, if a user presses a start switch (not illustrated), the original is conveyed to the top of the exposure glass 32 in the case where the original is set on the ADF 400. The scanner 300 is then driven, and a first running body 33 and a second running body 34 start running. As a result, light output from the first running body 33 is reflected by the original on the exposure glass 32. The reflected light is then reflected by a mirror of the second running body 34, and is guided to a scanning sensor 36 through an imaging lens 35. Thus, the image information of the original is read.

Furthermore, if the user presses the start switch, a driving motor (not illustrated) is driven. As a result, one of the supporting rollers 14, 15, and 16 is driven to rotate, whereby the intermediate transfer belt 10 is driven to rotate. At the same time, the photosensitive elements 20Y, 20C, 20M, and 20BK of the image forming units 18Y, 18C, 18M, and 18BK, respectively, and the secondary transfer belt 24 of the secondary transfer device 22 are also driven to rotate. The intermediate transfer belt 10, the photosensitive elements 20Y, 20C, 20M, and 20BK, and the secondary transfer belt 24 are controlled such that a constant relative speed is maintained therebetween. Subsequently, the exposing unit 21 irradiates the photosensitive elements 20Y, 20C, 20M, and 20BK of the image forming units with the writing light L on the basis of the image information read by the scanning sensor 36 of the scanner 300. With this operation, electrostatic latent images are formed on the photosensitive elements 20Y, 20C, 20M, and 20BK, and are developed by the developing units 61Y, 61C, 61M, and 61BK, respectively. Thus, visible toner images in yellow, cyan, magenta, and black are formed on the photosensitive elements 20Y, 20C, 20M, and 20BK, respectively. The toner images in each color thus formed are primarily transferred onto the intermediate transfer belt 10 sequentially so as to be superimposed one after another by the primary transfer devices 62Y, 62C, 62M, and 62BK. As a result, a composite toner image obtained by superimposing the toner images in each color is formed on the intermediate transfer belt 10. The belt cleaning device 17 removes transfer residual toner remaining on the intermediate transfer belt 10 after the secondary transfer.

Furthermore, if the user presses the start switch, a paper feeding roller 42 of a paper feeding table 200 corresponding to a transfer sheet selected by the user rotates to feed the transfer sheets from one of paper cassettes 44. The transfer sheets thus fed are separated into one sheet by a separating roller 45. The transfer sheet then enters a feed path 46, and is conveyed to a feed path 48 in the MFP main body 100 by carriage rollers 47. The transfer sheet conveyed in this manner is stopped when abutting on registration rollers 49. To use a transfer sheet not being set in the paper cassette 44, the transfer sheets set on a bypass tray 51 are fed by a paper feeding roller 50, and are separated into one sheet by a separating roller 52. Subsequently, the transfer sheet is conveyed through a bypass feed path 53, and is stopped when abutting on the registration rollers 49 in the same manner.

The registration rollers 49 start to rotate in synchronization with an operational timing at which the composite toner image formed on the intermediate transfer belt 10 as described above is conveyed to a secondary transfer unit facing the secondary transfer belt 24 of the secondary transfer device 22. While the registration rollers 49 are typically used by being grounded, a bias may be applied to the registration rollers 49 to remove paper powder on the transfer sheet. A direct-current (DC) voltage is used for the applied bias. Alternatively, an alternating-current (AC) voltage having a DC offset component may be used so as to charge the transfer sheet more uniformly. The surface of the transfer sheet after passing through the registration rollers 49 to which the bias is applied in this manner is charged in slightly negative polarity. As a result, transfer conditions for the secondary transfer from the intermediate transfer belt 10 to the transfer sheet in this case are different from those in the case where no bias is applied to the registration rollers 49. Therefore, it is necessary to change the transfer conditions appropriately.

The transfer sheet fed by the registration rollers 49 is conveyed to a secondary transfer nip formed between the intermediate transfer belt 10 and the secondary transfer belt 24. Subsequently, the secondary transfer device 22 secondarily transfers the composite toner image on the intermediate transfer belt 10 onto the transfer sheet. The transfer sheet onto which the composite toner image is transferred is then conveyed to the fixing device 27. The fixing device 27 then fixes the composite toner image onto the transfer sheet by heat and pressure. Subsequently, the transfer sheet is conveyed to ejecting rollers 56, and is ejected and stacked on a discharge tray 57.

Explanations will be made on examples in which the belt skew correcting device according to the present embodiment is used for a heating roller of the fixing device 27 in a fixing belt method with reference to the accompanying drawings.

FIRST EXAMPLE

An explanation is made on a first example, which is a first example of the fixing device 27 according to the present embodiment, with reference to the accompanying drawings.

Figure 3:
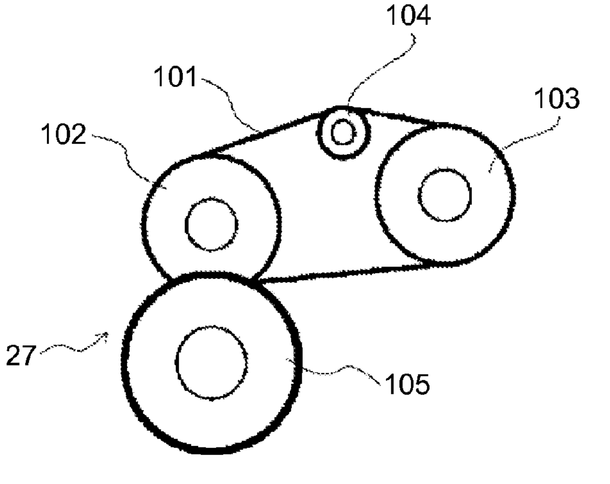
FIG. 3 is a sectional view for explaining a fixing device according to a first example.
Figure 4:
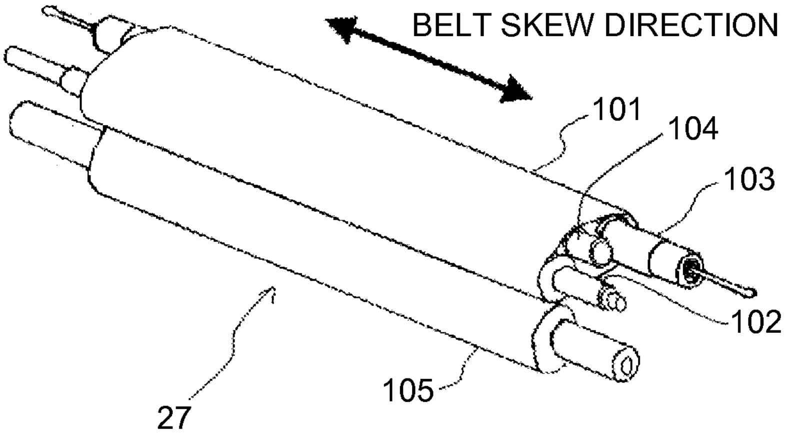
FIG. 4 is a perspective view of a main part of the fixing device according to the first example.
Figure 5A:
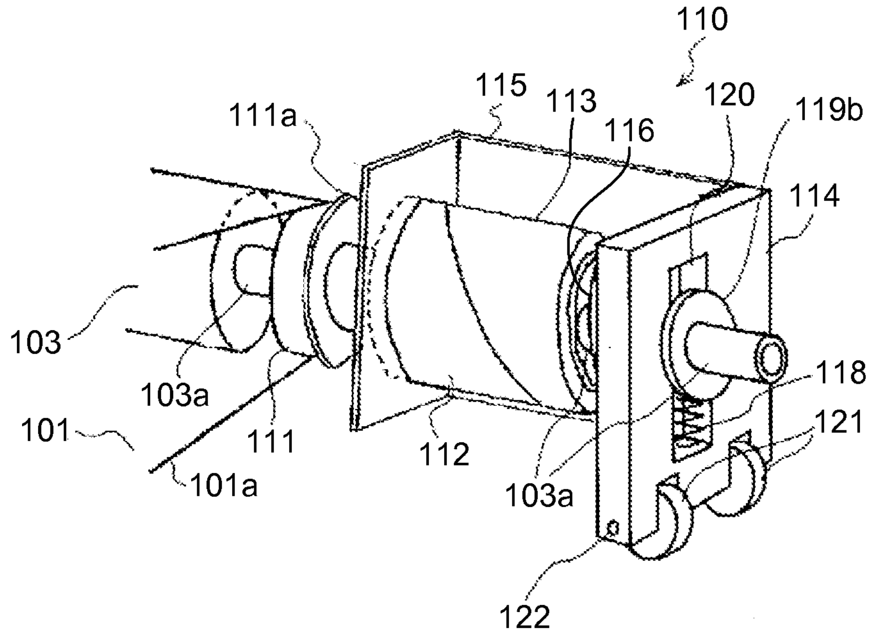
FIGS. 5A and 5B are views for explaining a configuration of a belt skew correcting device provided to a heating roller.
Figure 5B:
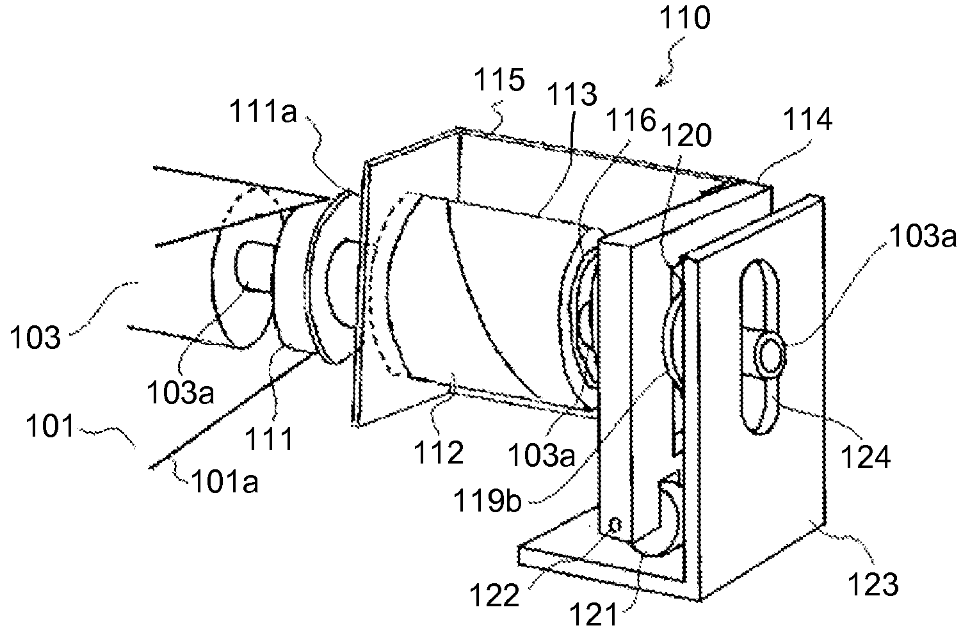
Figure 6:
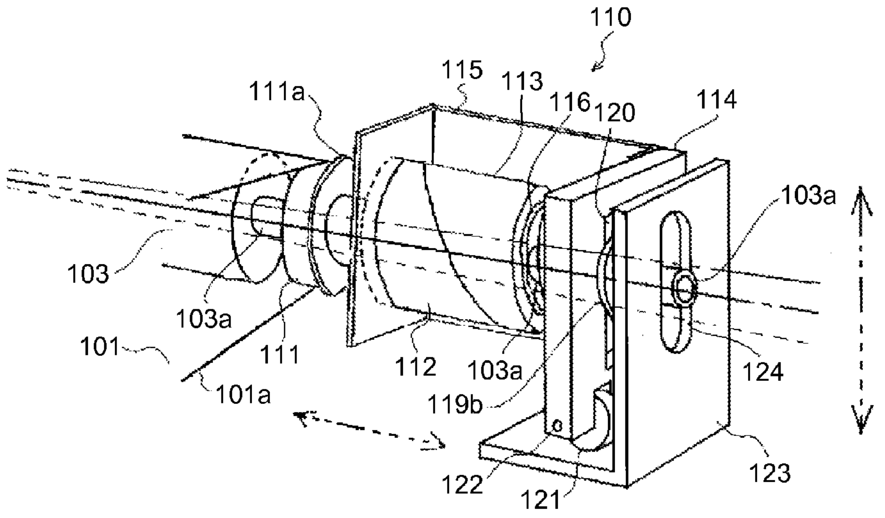
FIG. 6 is a view for explaining an operation of the belt skew correcting device provided to the heating roller.
Figure 7:
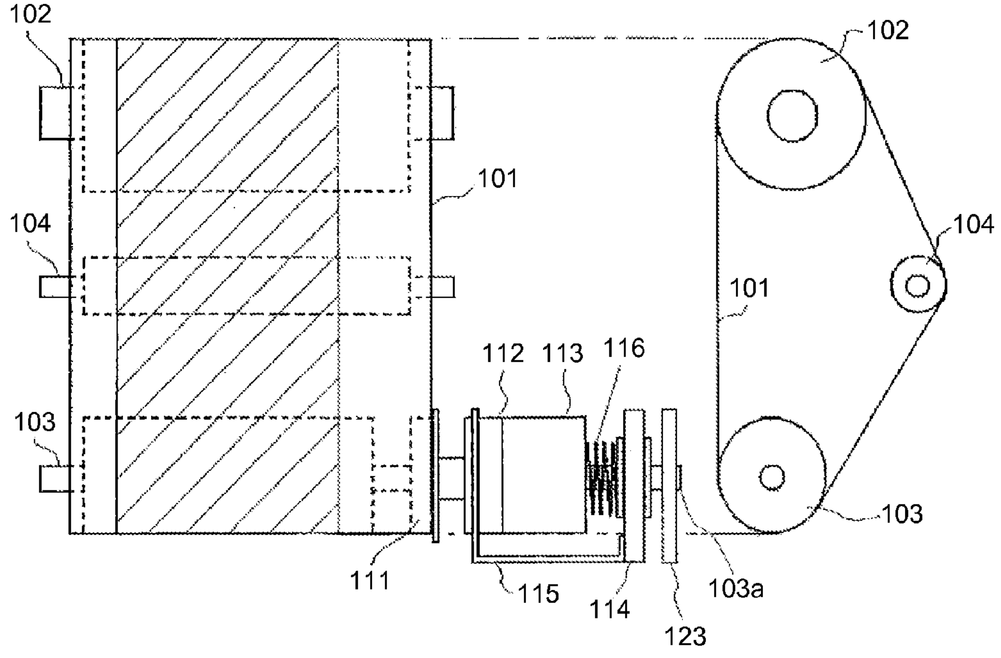
FIG. 7 is a view for explaining a positional relationship between an image forming area formed on an endless belt and the belt skew correcting device.
Figure 8:
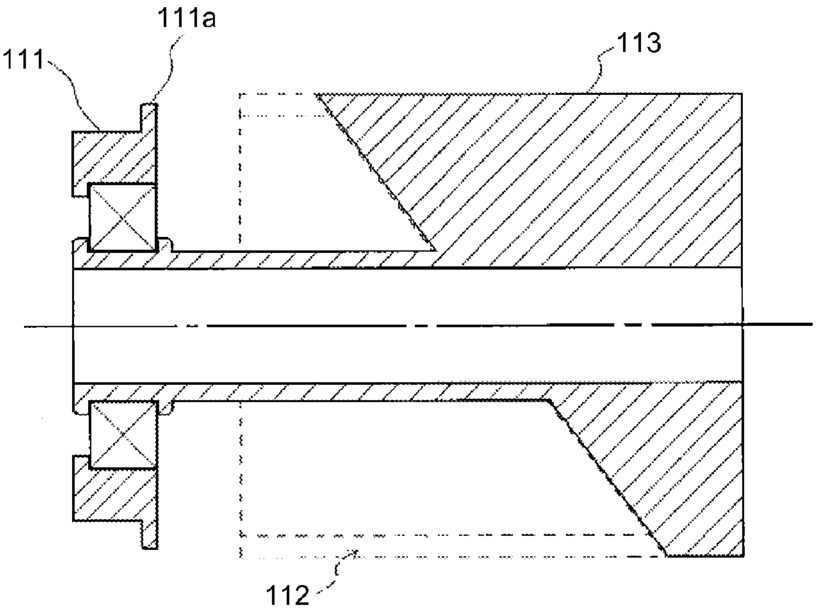
FIG. 8 is a view for explaining a roller shaft displacing member configured integrally with a belt movement following member.
Figure 9:
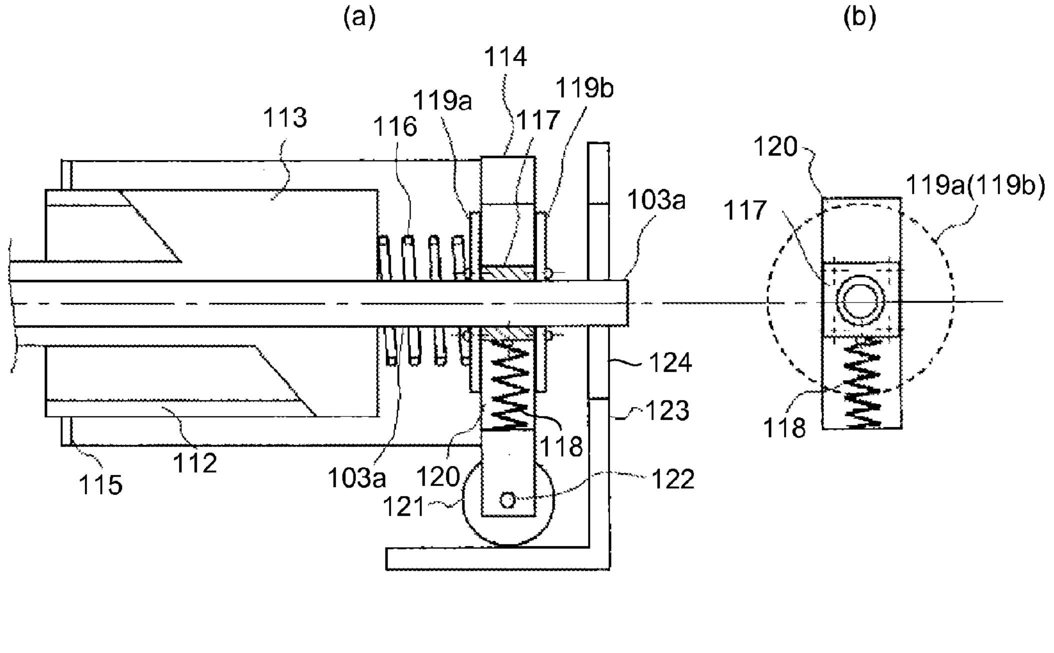
FIG. 9 is a view for explaining a unit that presses the belt movement following member.
Figure 10:
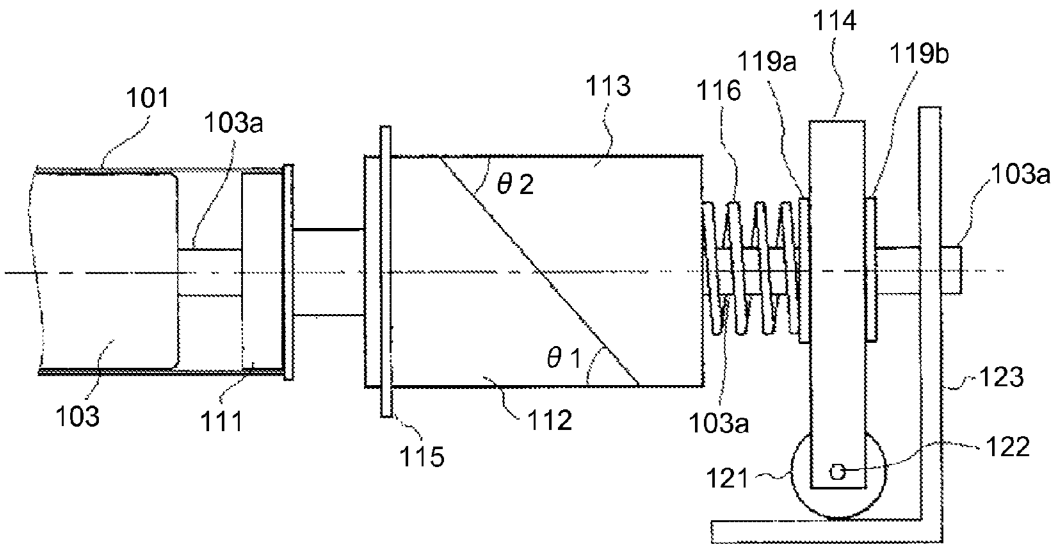
FIG. 10 is a view for explaining an angle of a surface at which obliquely cut cylindrical portions of the guide member and the roller shaft displacing member come into contact with each other.
Figure 11:
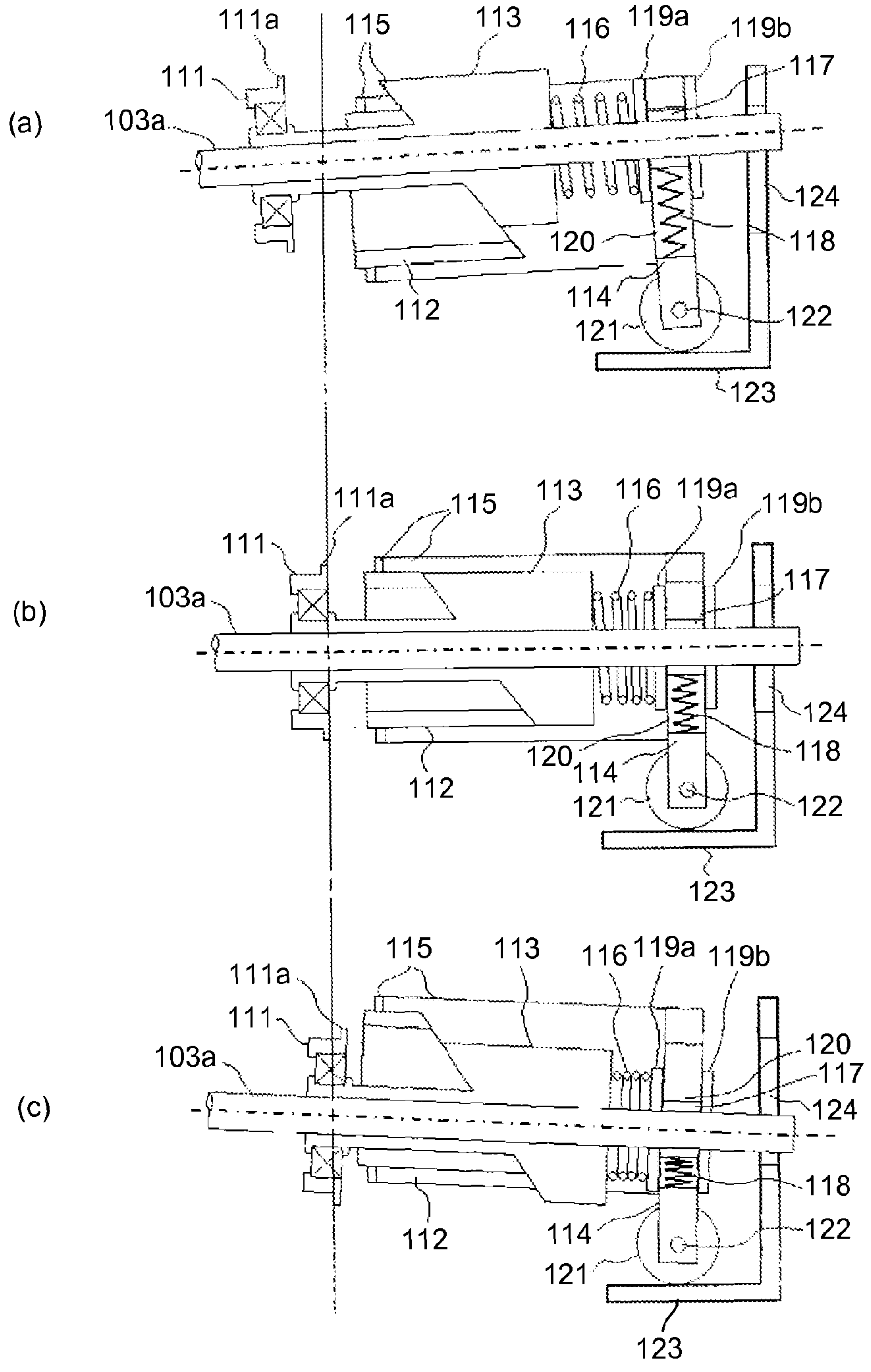
FIG. 11 is a view for explaining the statuses of the belt skew device during an operation for correcting belt skew.

FIG. 3 is a sectional view for explaining the fixing device 27 according to the present example. FIG. 4 is a perspective view of a main part of the fixing device 27 according to the present example. FIGS. 5A and 5B are views for explaining a configuration of a belt skew correcting device 110 provided to a heating roller 103. FIG. 5A is a perspective view of a movable part, and FIG. 5B is a perspective view illustrating a movable part supporting member that supports the movable part as well. FIG. 6 is a view for explaining an operation of the belt skew correcting device 110 provided to the heating roller 103. FIG. 7 is a view for explaining a positional relationship between an image forming area formed on a fixing belt 101 and the belt skew correcting device 110. FIG. 8 is a view for explaining a roller shaft displacing member 113 configured integrally with a belt movement following member 111. FIG. 9 is a view for explaining a unit that presses the belt movement following member 111. FIG. 9(*a*) illustrates a section parallel to a heating roller shaft 103*a*, and FIG. 9(*b*) illustrates a plane of a guide loose hole provided to a guide holding member 114 arranged perpendicularly to the heating roller shaft 103*a*. FIG. 10 is a view for explaining an angle of a surface at which obliquely cut cylindrical portions of a guide member 112 and the roller shaft displacing member 113 come into contact with each other. FIG. 11 is a view for explaining the states of the belt skew device during an operation for correcting belt skew.

As illustrated in FIG. 3, the fixing device 27 in the present example mainly includes the fixing belt 101 that is a wide endless belt stretched across a fixing roller 102, the heating roller 103, and a tension roller 104, and a pressing roller 105. The pressing roller 105 is pressed against the fixing roller 102 with the fixing belt 101 interposed therebetween to form a fixing nip. In the fixing device 27 with such a configuration, a belt skew occurs in the arrow direction (FIG. 4), that is, in the axial direction of each roller because of the configuration of each component or left and right deviation in each component.

Therefore, in the fixing device 27 in the present example, the belt skew correcting device 110 is provided only to a first side of the heating roller 103 serving as a following roller, thereby suppressing skew of the fixing belt 101 effectively. FIGS. 5A, 5B, and 6 are enlarged views illustrating only the first side of the heating roller 103 to which the belt skew correcting device 110 is provided. In FIGS. 5A, 5B, and 6, the fixing belt 101 is stretched around the heating roller 103 and the belt movement following member 111. The fixing belt 101 is stretched around the belt movement following member 111 with a fixing belt end 101*a* of the fixing belt 101 coming into contact with a flange portion 111*a* provided to an end of the belt movement following member 111.

The belt skew correcting device 110 mainly includes the belt movement following member 111, the roller shaft displacing member 113, the guide member 112, the guide holding member 114, a guide frame 115, and a movable part supporting member 123. The belt movement following member 111 and the roller shaft displacing member 113 are integrally configured, and are arranged in a movable manner in the axial direction of the heating roller shaft 103*a* rotatably supporting the heating roller 103. Furthermore, the heating roller shaft 103*a* is supported by a rotation fulcrum (not illustrated) on a second end side such that a first end on the belt skew correcting device 110 side is made tiltable along a trajectory in a substantially vertical direction as illustrated in FIG. 6, and that the heating roller shaft 103*a* does not rotate about the axis thereof.

The belt movement following member 111 is required to be arranged in a movable manner in the axial direction of the heating roller shaft 103*a* as described above. Therefore, the belt movement following member 111 is arranged distant from an end of the heating roller 103 with a certain distance interposed therebetween as illustrated in FIG. 7. The roller shaft displacing member 113 configured integrally with the belt movement following member 111 includes a portion processed into an obliquely cut cylinder as illustrated in FIG. 8. The obliquely cut cylindrical portion comes into contact with an obliquely cut cylindrical portion of the guide member 112 by the own weight of the heating roller 103. The guide member 112 is fixed to the guide holding member 114 via the guide frame 115.

The belt movement following member 111 and the roller shaft displacing member 113 are integrally configured such that the roller shaft displacing member 113 is connected to the belt movement following member 111 via a bearing 111*b* fit into the belt movement following member 111. With such an integrated configuration, even if the belt movement following member 111 rotates in association with rotation of the fixing belt 101, the roller shaft displacing member 113 is not dragged to rotate by the belt movement following member 111. Because the roller shaft displacing member 113 is not dragged to rotate, it is possible to keep the amount of roller shaft displacement stable.

As illustrated in FIG. 9(*a*), the roller shaft displacing member 113 is biased toward the left side (rotation fulcrum side) in FIG. 9(*a*) by an axial direction elastic member 116. One end of the axial direction elastic member 116, such as a positioning spring, is supported by a slide guiding plate 119*a* fixed to the heating roller shaft 103*a*. The action of biasing causes the flange 111*a* of the belt movement following member 111 configured integrally with the roller shaft displacing member 113 to come into contact with the fixing belt end 101*a* constantly. As illustrated in FIG. 9, the slide guiding plate 119*a* is fixed to the heating roller shaft 103*a* such that the slide guiding plate 119*a* is fixed to a shaft holder 117 fit around the heating roller shaft 103*a* with a screw from the roller shaft displacing member 113 side. The axial direction elastic member 116 is a spring in the present example. Alternatively, various types of well-known elastic bodies other than the spring may be used as appropriate. Furthermore, to reduce load applied to the fixing belt 101, it is preferable that the constant of spring of the axial direction elastic member 116 be set as small as possible. However, when the fixing belt 101 moves to the left or the right, it is required that the belt movement following member 111 is caused to follow the movement of the fixing belt 101 due to the belt skew, which will be described later in detail. Therefore, the minimum constant of spring is required to be set.

The guide member 112 is configured to slidably contact with the roller shaft displacing member 113 at their inclined sectional surfaces, each obtained by diagonally cutting off a part of the cylindrical body. Furthermore, the guide member 112 is configured to tilt in parallel with the rotatable heating roller shaft 103*a*, and to move substantially upward and downward. To move the guide member 112 in this manner, the guide member 112 is fixed to the guide holding member 114 arranged perpendicularly to the heating roller shaft 103*a* via the guide frame 115 formed into a nearly U-shape. The guide member 112 is fitted and fixed to a first surface formed by a side that is perpendicular to the heating roller shaft 103*a*, and that has a free end of the U, with the axis of the cylinder of the guide member 112 arranged perpendicularly to the first surface. Furthermore, a second surface formed by a side parallel to the first surface is brought into contact with and fixed to the surface of the guide holding member 114. In the guide holding member 114, a guiding unit elongate hole 120 in a rectangular shape is formed. The guiding unit elongate hole 120 supports the shaft holder 117 whose thickness in the axial direction is slightly larger than the thickness of the guide holding member 114 in a slidable manner in the direction of rotation of the heating roller shaft 103*a*, that is, in the vertical direction of the guide holding member 114. The slide guiding plate 119*a* is fixed to the shaft holder 117 on the roller shaft displacing member 113 side as described above, and a slide guiding plate 119*a* is fixed thereto with a screw on the other side. Thus, the slide guiding plates sandwich the guide holding member 114 from both sides in a slidable manner. With the configuration described above, the guide member 112 and the guide holding member 114 can tilt in parallel with the heating roller shaft 103*a* that rotates, and move nearly upward and downward in association with movement of the roller shaft displacing member 113 in the axial direction.

The obliquely cut cylindrical portions of the guide member 112 and the roller shaft displacing member 113 come into contact with each other by the own weight of the heating roller 103. In the present example, however, to reduce the own weight of the heating roller 103, a rotation direction elastic member 118, such as a spring, is provided. The rotation direction elastic member 118 biases the shaft holder 117 fixed to the heating roller shaft 103*a* in the upward direction of the guide holding member 114. To use the force biasing the shaft holder 117 as reaction force when the heating roller shaft 103*a* tilts, two rollers 121 are attached to a lower portion of the guide holding member 114 in a rotatable manner. Furthermore, the guide holding member 114 is placed on a horizontal surface of the movable part supporting member 123 fixed to the apparatus main body. By placing the guide holding member 114 on the horizontal surface of the movable part supporting member 123 via the rollers 121, it is possible to obtain reaction force against one end side of the biasing force applied by the rotation direction elastic member 118. As a result, it is possible to reduce the own weight of the heating roller 103.

In the nearly vertical surface of the movable part supporting member 123, a restricting elongate hole 124 is formed. The restricting elongate hole 124 restricts movement of the heating roller shaft 103*a* in the horizontal direction caused by tension of the fixing belt 101 applied by the tension roller 104. In addition, the restriction elongate hole 124 allows the heating roller shaft 103*a* to tilt. The rotation direction elastic member 118 is not limited to the spring illustrated in FIG. 9, and may be a plate spring that biases the heating roller shaft 103*a* directly or indirectly, for example. Furthermore, as long as it is possible to reduce the contact pressure of the guide member 112 and the roller shaft displacing member 113 caused by the own weight of the heating roller 103, various types of elastic bodies can be used for the roller shaft displacing member 113. However, the guide member 112 and the roller shaft displacing member 113 are required to come into contact with each other constantly while being subjected to the action of the own weight of the heating roller 103. Therefore, the weight of the heating roller 103 determines the constant of spring of the elastic body used for the rotation direction elastic member 118.

In the present example, as illustrated in FIG. 10, the inclination angle of the obliquely cut cylindrical portion of the guide member 112 with respect to the heating roller shaft 103*a* is equal to that of the obliquely cut cylindrical portion of the roller shaft displacing member 113. In other words, an inclination angle θ1 of the obliquely cut cylindrical portion of the guide member 112 is equal to an inclination angle θ2 of the obliquely cut cylindrical portion of the roller shaft displacing member 113 in FIG. 10. With such a configuration of the inclination angles, the heating roller shaft 103*a* tilts in a substantially vertical direction in association with skew of the fixing belt 101.

If the fixing belt 101 moves to the right as indicated by a dashed line in FIG. 6, for example, the heating roller shaft 103*a* tilts downward as indicated by a dashed line in FIG. 6 along the inclination angle θ1 of the obliquely cut cylindrical portion of the guide member 112 by the own weight of the heating roller 103. At this time, if θ1=θ2 is satisfied as illustrated in FIG. 10, the obliquely cut cylindrical portions of the guide member 112 and the roller shaft displacing member 113 come into contact with each other at a surface. As a result, it is possible to suppress occurrence of local abrasion in the guide member 112 and the roller shaft displacing member 113. Therefore, the angles θ1 and θ2 do not change over time, and it is possible to suppress occurrence of a backlash due to uneven abrasion. Accordingly, such a configuration of the inclination angles not only can keep the amount of roller shaft displacement stable, but also can extend the lifetimes of the roller shaft displacing member 113 and the guide member 112 effectively. Furthermore, the guide holding member 114 is placed on the movable part supporting member 123 via the two rollers 121 in the present example. Therefore, it is possible to suppress occurrence of a backlash due to uneven abrasion of the guide holding member 114 and the movable part supporting member 123. However, the configuration of the contact portion of the guide holding member 114 and the movable part supporting member 123 is not limited thereto, and may be any configuration as long as it causes no uneven abrasion.

Operations of the belt skew correcting device 110 according to the present invention will now be described. When the fixing roller 102 does not drive, that is, when the fixing belt 101 does not rotate, the axis of the cylinder of the roller shaft displacing member 113 and the axis of the cylinder of the guide member 112 are positioned substantially coaxially in the belt skew correcting device 110 as illustrated in FIG. 11(*b*). At this time, the obliquely cut cylindrical portion of the roller shaft displacing member 113 is held while coming into contact with the obliquely cut cylindrical portion of the guide member 112 by the own weight of the heating roller 103. Even in this state, the axial direction elastic member 116 biases the roller shaft displacing member 113 toward left in FIG. 11(*b*). As a result, the flange portion 111*a* of the belt movement following member 111 configured integrally with the roller shaft displacing member 113 comes into contact with the belt end 101*a* of the fixing belt 101.

After the start of rotation of the fixing roller 102, if skew of the fixing belt 101 occurs toward right as indicated by the dashed line in FIG. 6 because of any cause, such as the parallelism between the members, the belt movement following member 111 is also pushed toward right in FIG. 6 in association with the skew of the fixing belt 101. At this time, the roller shaft displacing member 113 configured integrally with the belt movement following member 111 is also pushed toward right in FIG. 6. As a result, belt skew force greater than the spring force of the axial direction elastic member 116 biasing the roller shaft displacing member 113 is generated. If such belt skew force is generated, the roller shaft displacing member 113 is also pushed toward right in FIG. 6.

At this time, because the roller shaft displacing member 113 is formed into an obliquely cut cylinder, the heating roller shaft 103*a* is guided by the guide member 112 by means of the own weight of the heating roller 103. The heating roller shaft 103*a* then tilts downward as indicated by a dashed line in FIG. 6 from an initial position of the heating roller shaft 103*a* indicated by a dashed-dotted line in FIG. 6. More specifically, as illustrated in FIG. 10, the obliquely cut cylindrical portion of the roller shaft displacing member 113 is guided by the obliquely cut cylindrical portion of the guide member 112 capable of moving in parallel with the heating roller shaft 103*a*, and moves downward in a sliding manner. In association with the movement, the heating roller shaft 103*a* resists the elastic force of the rotation direction elastic member 118 provided to the guide holding member 114, and tilts downward. Because the guide holding member 114 is sandwiched by the slide guiding plates 119*a* and 119*b*, the guide holding member 114 slides vertically with respect to the heating roller shaft 103*a* when the heating roller shaft 103*a* tilts downward. In addition, the guide holding member 114 rotates about a rotating shaft 122 of the roller 121.

If the heating roller shaft 103*a* tilts downward, the fixing belt 101 moves to the left in FIG. 6 depending on the inclination angle of the heating roller shaft 103*a* as will be described later. Therefore, it is possible to reduce and converge the belt skew.

Similarly, if skew of the fixing belt 101 occurs toward left as indicated by a dashed-two dotted line in FIG. 6, the belt movement following member 111 around which the fixing belt 101 is stretched, and that rotates together with the fixing belt 101 also moves toward left in FIG. 6. This is because the roller shaft displacing member 113 configured integrally with the belt movement following member 111 is biased by the positioning axial direction elastic member 116. At this time, the belt movement following member 111 moves toward left in FIG. 6 with the flange 111*a* coming into contact with the belt end 101*a*. Naturally, the roller shaft displacing member 113 configured integrally with the belt movement following member 111 is also moved toward left in FIG. 6 in association with the movement of the belt movement following member 111.

At this time, the obliquely cut cylindrical portion of the guide member 112 that moves in parallel with the heating roller shaft 103*a* comes into contact with the obliquely cut cylindrical portion of the roller shaft displacing member 113 in a slidable manner. Because of such a contact state, the heating roller shaft 103*a* is guided by the guide member 112 in association with the movement of the roller shaft displacing member 113. The heating roller shaft 103*a* then tilts upward as indicated by a dashed-two dotted line in FIG. 6 from the initial position of the heating roller shaft 103*a* indicated by the dashed-dotted line in FIG. 6. More specifically, as illustrated in FIG. 10, the obliquely cut cylindrical portion of the roller shaft displacing member 113 is guided by the obliquely cut cylindrical portion of the guide member 112 capable of moving in parallel with the heating roller shaft 103*a*, and moves upward in a sliding manner. In association with the movement, the heating roller shaft 103*a* tilts upward. Because the guide holding member 114 is sandwiched by the slide guiding plates 119*a* and 119*b*, the guide holding member 114 slides vertically with respect to the heating roller shaft 103*a* when the heating roller shaft 103*a* tilts downward. In addition, the guide holding member 114 rotates about the rotating shaft 122 of the roller 121.

If the heating roller shaft 103*a* tilts upward, the fixing belt 101 moves to the right in FIG. 6 depending on the inclination angle of the heating roller shaft 103*a* as will be described later. Therefore, it is possible to reduce and converge the belt skew.

An explanation will be made on the principle of the fact that belt skew is corrected by the tilt of the heating roller shaft 103*a* as described above. An assumption is made that a fixing belt is a rigid body, and an arbitrary point on the fixing belt before entering a specific roller is focused. If the fixing belt is stretched across a plurality of rollers in a completely horizontal and parallel state, the point rotates on each of the rollers in association with rotation of the rollers without moving in the roller shaft direction. Because the point rotates in this manner, no skew of the fixing belt occurs.

On the other hand, if a roller shaft of one of the rollers is tilted with respect to a roller shaft of another roller, and the inclination angle is assumed to be $\alpha$, the point on the fixing belt moves by tan $\alpha$ in the shaft direction with respect to the belt entering direction in association with rotation of the roller thus tilted. In other words, in FIG. 5A, the heating roller shaft 103*a* is tilted downward by an inclination angle $\alpha$ with respect to the tension roller 104 arranged upstream of the heating roller shaft 103*a* in the direction in which the fixing belt 101 enters the heating roller 103. As a result, it is possible to move the fixing belt 101 to the left in FIG. 5A by tan $\alpha$ in association with rotation of the heating roller 103. This action is a physical action. Therefore, if the heating roller shaft 103*a* is tilted upward with respect to the horizontal direction, it is possible to move the fixing belt 101 to the right in FIG. 5A in association with rotation of the heating roller 103.

The rotation direction elastic member 118 arranged for reducing the own weight of the heating roller 103 on the guide member 112 is not necessarily provided to embody the present invention. However, in the case where no rotation direction elastic member 118 is provided, the roller shaft displacing member 113 fails to be moved upward unless the reaction force against the entire own weight of the heating roller 103 is generated by the action of belt skew. Since such a configuration is disadvantageous in the flexible and reliable belt skew control, it is preferable to employ the rotation direction elastic member 118.

As described above, a gap required for the belt movement following member 111 to move to the left in FIG. 7 is provided between the heating roller 103 and the belt movement following member 111 as illustrated in FIG. 7. Similarly, a gap is provided between the roller shaft displacing member 113 and the guide holding member 114. The gap is required for the axial direction elastic member 116 to be inserted therein, and is required for the roller shaft displacing member 113 to move to the right in FIG. 7. With such gaps, it is possible not only to keep the amount of roller shaft displacement stable, but also to form an image stably.

SECOND EXAMPLE

Figure 12:
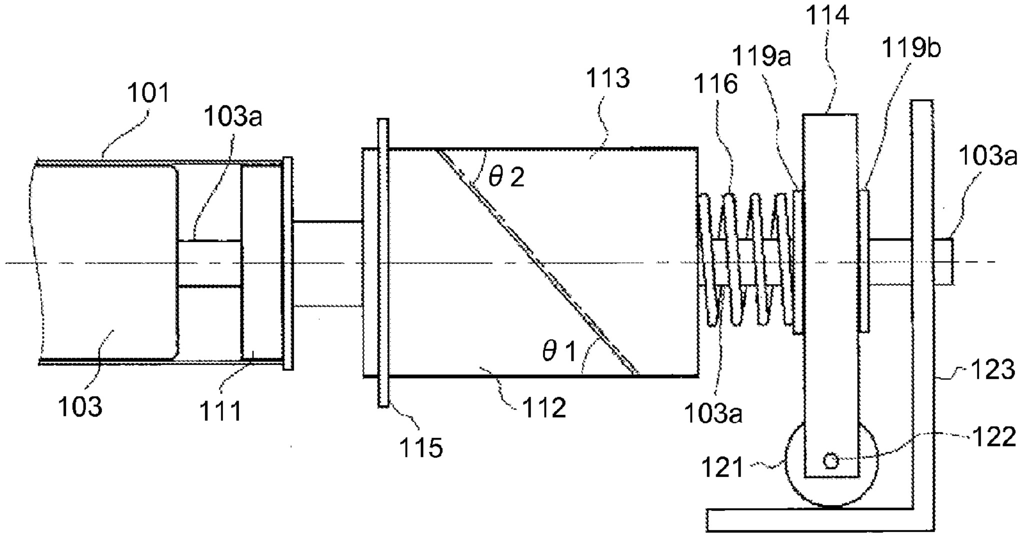
FIG. 12 is a view for explaining the case where polymer resin having a low friction coefficient is applied to a portion of the roller shaft displacing member coming into contact with the guide member in the belt skew correcting device according to a second example.
Figure 13:
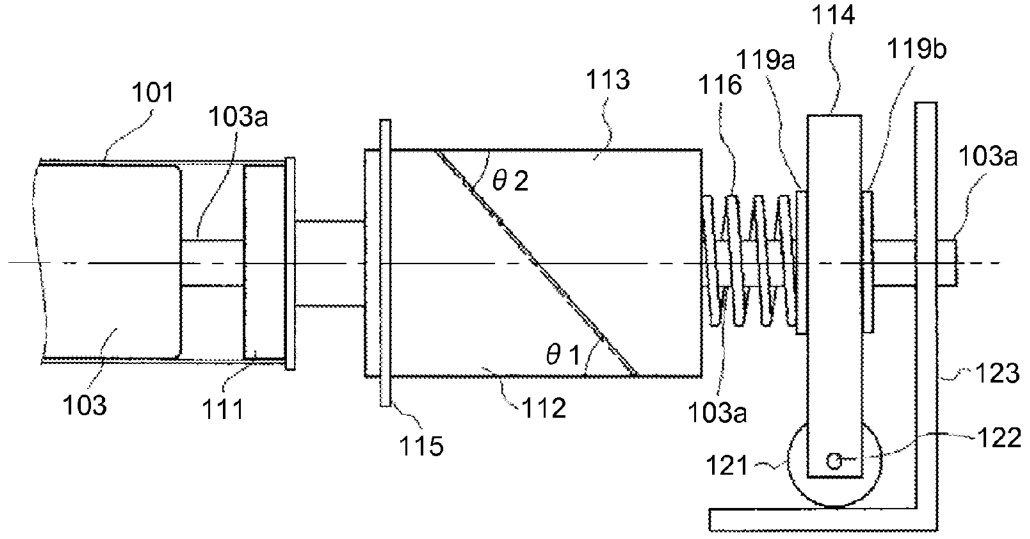
FIG. 13 is a view for explaining the case where polymer resin having a low friction coefficient is applied to a portion of the guide member coming into contact with the roller shaft displacing member in the belt skew correcting device according to the second example.

An explanation is made on a second example, which is a second example of the fixing device 27 according to the present embodiment, with reference to the accompanying drawings. The present example is different from the first example only in the following respect: polymer resin having a low friction coefficient is applied to the obliquely cut cylindrical portion of the roller shaft displacing member 113 or the obliquely cut cylindrical portion of the guide member 112 in the belt skew correcting device 110 according to the present example. Therefore, in this example, the explanation of other configurations, functions or advantageous effects common to the first example is omitted as appropriate. FIG. 12 is a view for explaining the case where the polymer resin having a low friction coefficient is applied to the portion of the roller shaft displacing member 113 coming into contact with the guide member 112 in the belt skew correcting device 110 according to the present example. FIG. 13 is a view for explaining the case where the polymer resin having a low friction coefficient is applied to the portion of the guide member 112 coming into contact with the roller shaft displacing member 113 in the belt skew correcting device 110 according to the present example.

If skew of the fixing belt 101 occurs, and the fixing belt 101 moves to the left or the right in FIG. 12, the belt movement following member 111 moves to the left or the right in association with the movement of the fixing belt 101. As a result, the obliquely cut surface cylindrical portion of the roller shaft displacing member 113 slides on the obliquely cut cylindrical portion of the guide member 112, whereby friction occurs. The occurrence of such friction may cause abrasion in the roller shaft displacing member 113. To address this problem, polymer resin having a low friction coefficient, such as polytetrafluoroethylene (PTFE), is applied to the obliquely cut cylindrical portion (portion indicated by a dashed-dotted line) of the roller shaft displacing member 113 that slides on the obliquely cut cylindrical portion of the guide member 112. By applying the polymer resin in this manner, the friction force described above can be reduced. Therefore, it is possible to keep the amount of roller shaft displacement stable without attenuating the movement of the roller shaft displacing member 113 along the obliquely cut cylindrical portion of the guide member 112.

Furthermore, the occurrence of such friction may cause abrasion in the guide member 112 in the same manner. To address this problem, polymer resin having a low friction coefficient, such as PTFE, is applied to the obliquely cut cylindrical portion (portion indicated by a dashed-dotted line) of the guide member 112 that slides on the obliquely cut cylindrical portion of the roller shaft displacing member 113. By applying the polymer resin, the friction force described above can be reduced. Therefore, it is possible to keep the amount of roller shaft displacement stable without attenuating the movement of the roller shaft displacing member 113 along the obliquely cut cylindrical portion of the guide member 112.

In the present embodiment, the explanation has been made of the example in which the present invention is applied to the fixing device. However, the belt device to which the belt skew correcting device according to the present invention is applicable is not limited to the belt device used for the fixing device, and may be various types of belt devices used for an image forming apparatus. The belt skew correcting device can be applied to belt devices used for a photosensitive element belt, an intermediate transfer belt, and a transfer material conveying belt, for example.

As described above, the belt skew correcting device 110 of the MFP according to the present embodiment has the following functions and advantageous effects. The obliquely cut cylindrical portion of the roller shaft displacing member 113 that does not rotate with respect to the heating roller shaft 103*a* is guided by the obliquely cut cylindrical portion of the guide member 112 that comes into contact therewith in a slidable manner. By guiding the portion in this manner, it is possible to tilt the heating roller shaft 103*a* in a manner corresponding to the amount of movement of the fixing belt 101 in the roller shaft direction. As a result, it is possible to correct belt skew stably. Furthermore, the inclination angle of the obliquely cut cylindrical portion of the roller shaft displacing member 113 with respect to the heating roller shaft 103*a* is equal to that of the obliquely cut cylindrical portion of the guide member 112. As a result, the contact area in which the portion of the roller shaft displacing member 113 slides can be made larger than that in the conventional configuration. With such a larger contact area, uneven abrasion is less likely to occur in the contact surface between the roller shaft displacing member 113 and the guide member 112 than the conventional configuration. As a result, it is possible not only to extend the lives of the members, but also to suppress occurrence of a backlash due to uneven abrasion. Therefore, it is possible to provide the belt skew correcting device 110 that can suppress occurrence of a backlash due to uneven abrasion, that can correct belt skew stably, and that is excellent in durability compared with the conventional configuration.

In the belt skew correcting device 110 of the MFP according to the present embodiment, the gap between the belt movement following member 111 and the heating roller 103 is set such that the end of each roller around which the fixing belt 101 is stretched is positioned outside of the image forming area of the belt. By setting the gap in this manner, it is possible not only to keep the amount of roller shaft displacement stable, but also to form an image stably.

In the belt skew correcting device 110 of the MFP according to the present embodiment, the polymer resin having a low friction coefficient (e.g., PTFE) is applied to the portion of the roller shaft displacing member 113 coming into contact with the guide member 112. By applying the polymer resin in this manner, it is possible not only to keep the amount of roller shaft displacement stable, but also to extend the lives of the roller shaft displacing member 113 and the guide member 112.

In the belt skew correcting device 110 of the MFP according to the present embodiment, the polymer resin having a low friction coefficient (e.g., PTFE) is applied to the portion of the guide member 112 coming into contact with the roller shaft displacing member 113. By applying the polymer resin in this manner, it is possible not only to keep the amount of roller shaft displacement stable, but also to extend the lives of the roller shaft displacing member 113 and the guide member 112.

In the belt device including the belt skew correcting device 110 of the MFP according to the present embodiment, the endless belt is the fixing belt used for the fixing device 27. Therefore, the fixing belt device can enjoy the functions and the advantageous effects described above.

In the belt device including the belt skew correcting device 110 of the MFP according to the present embodiment, the endless belt is the photosensitive element belt used for the photosensitive element belt device. Therefore, the photosensitive element belt device can enjoy the functions and the advantageous effects described above.

In the belt device including the belt skew correcting device 110 of the MFP according to the present embodiment, the endless belt is the intermediate transfer belt 10 used for the intermediate transfer belt device. Therefore, the intermediate transfer belt device can enjoy the functions and the advantageous effects described above.

In the belt device including the belt skew correcting device 110 of the MFP according to the present embodiment, the endless belt is the transfer material conveying belt used for the transfer material conveying belt device. Therefore, the transfer material conveying belt device can enjoy the functions and the advantageous effects described above.

The MFP serving as the image forming apparatus according to the present embodiment includes any of the belt devices described above. Therefore, the MFP can enjoy the functions and the advantageous effects similar to those for any of the belt devices described above.

According to the present invention, it is possible to suppress occurrence of a backlash due to uneven abrasion compared with the conventional configuration. Therefore, it is possible to provide a belt skew correcting device that can correct belt skew stably and that is excellent in durability.

In the present invention, the obliquely cut cylindrical portion of the roller shaft displacing member that does not rotate with respect to the roller shaft of the roller configured to be tiltable is guided by the obliquely cut cylindrical portion of the guide that comes into contact therewith in a slidable manner. By guiding the portion in this manner, it is possible to tilt the roller shaft of the roller configured to be tiltable in a manner corresponding to the amount of movement of the endless belt in the roller shaft direction. As a result, it is possible to correct belt skew stably.

Furthermore, the inclination angle of the obliquely cut cylindrical portion of the roller shaft displacing member with respect to the roller shaft of the roller configured to be tiltable is equal to that of the obliquely cut cylindrical portion of the guide. As a result, the contact area in which the portion of the roller shaft displacing member slides can be made larger than that in the conventional configuration. With such a larger contact area, uneven abrasion is less likely to occur in the contact surface between the roller shaft displacing member and the guide than in the conventional configuration. As a result, it is possible not only to extend the lives of the members, but also to suppress occurrence of a backlash due to uneven abrasion.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A belt skew correcting device that corrects a skew of an endless belt which is supported by a plurality of rollers and which is driven to rotate around the plurality of rollers, the belt skew correcting device comprising:

a following member that follows a movement of the endless belt along an rotational shaft of one of the plurality of rollers and also follows a rotational movement of the endless belt around the rotational shaft;

a dislocating member that is configured integrally with the following member in order to follow the movement of the endless belt along the rotational shaft and not to follow the rotational movement of the endless belt around the rotational shaft; and a guide member that guides the dislocating member, wherein the dislocating member has a cylindrical shape, a part of which is cut off diagonally so that the dislocating member has an inclined sectional surface, the guide member has a cylindrical shape, a part of which is cut off diagonally so that the guide member has an inclined sectional surface to abut slidably on the inclined sectional surface of the dislocating member, an angle of the inclined sectional surface of the dislocating member with respect to the rotational shaft is the same as an angle of the inclined sectional surface of the guide member with respect to the rotational shaft, and the inclined sectional surface of the dislocating member is guided by the inclined sectional surface of the guide member in accordance with a following movement of the following member, so that the rotational shaft is given a tilt corresponding to an amount of the movement of the endless belt along the rotational shaft, and thereby the one roller can be tilted.

2. The belt skew correcting device according to claim 1, wherein a gap is arranged between the following member and the one roller that can be tilted so that an edge portion of each of the plurality of rollers supporting the endless belt is located outside a working area of the endless belt.

3. The belt skew correcting device according to claim 1, wherein a polymer material having a low friction coefficient is applied to a part of the dislocating member where the guide member abuts thereon.

4. The belt skew correcting device according to claim 1, wherein a polymer material having a low friction coefficient is applied to a part of the guide member where the dislocating member abuts thereon.

5. A belt device comprising an endless belt and the device including the belt skew correcting device according to claim 1, wherein the endless belt is a fixing belt used in an image forming apparatus.

6. A belt device comprising an endless belt and the belt skew correcting device according to claim 1, wherein the endless belt is a photosensitive belt used in an image forming apparatus.

7. A belt device comprising an endless belt and the belt skew correcting device according to claim 1, wherein the endless belt is an intermediate transfer belt used in an image forming apparatus.

8. A belt device comprising an endless belt and the belt skew correcting device according to claim 1, wherein the endless belt is a transfer material carrying belt used in an image forming apparatus.

9. An image forming apparatus comprising a belt skew correcting device that corrects a skew of an endless belt which is supported by a plurality of rollers and which is driven to rotate around the plurality of rollers, the belt skew correcting device including:

a following member that follows a movement of the endless belt along a rotational shaft of one of the plurality of rollers and also follows a rotational movement of the endless belt around the rotational shaft;

a dislocating member that is configured integrally with the following member in order to follow the movement of the endless belt along the rotational shaft and not to follow the rotational movement of the endless belt around the rotational shaft; and a guide member that guides the dislocating member, wherein the dislocating member has a cylindrical shape, a part of which is cut off diagonally so that the dislocating member has an inclined sectional surface, the guide member has a cylindrical shape, a part of which is cut off diagonally so that the guide member has an inclined sectional surface to abut slidably on the inclined sectional surface of the dislocating member, an angle of the inclined sectional surface of the dislocating member with respect to the rotational shaft is the same as an angle of the inclined sectional surface of the guide member with respect to the rotational shaft, and the inclined sectional surface of the dislocating member is guided by the inclined sectional surface of the guide member in accordance with a following movement of the following member, so that the rotational shaft is given a tilt corresponding to an amount of the movement of the endless belt along the rotational shaft, and thereby the one roller can be tilted.

10. The belt skew correcting device according to claim 1, wherein the following member and the dislocating member are integrally configured, and are arranged in a movable manner in an axial direction of a heating roller shaft rotatably supporting a heating roller.

11. The belt skew correcting device according to claim 10, wherein the following member is arranged a distant from an end of the heating roller so that the following member is movable in the axial direction of the heating roller.

12. The belt skew correcting device according to claim 1, wherein the dislocating member is connected to the following member via a bearing, which fits into the following member.

13. The belt skew correcting device according to claim 1, wherein the guide member is fixed to a guide holding member arranged perpendicularly to a heating roller shaft via a guide frame.

14. The belt skew correcting device according to claim 13, wherein the guide frame is U-shaped.

15. The belt skew correcting device according to claim 13, wherein the guide holding member includes a guide unit elongate hole and a shaft holder.

16. The belt skew correcting device according to claim 15, wherein the guide unit elongate hole supports the shaft holder whose thickness in an axial direction is larger than a thickness of the guide holding member in a slidable manner in a direction of rotation of the heating roller shaft.

17. The belt skew correcting device according to claim 16, wherein a slide guiding plate is fixed to the shaft holder on a side of the dislocating member, and the slide guiding plate is fixed thereto with a screw on the other side.

18. The belt skew correcting device according to claim 1, wherein the inclined sectional surfaces of the guide member and the dislocating member come into contact with each other by the own weight of the heating roller.

19. The belt skew correcting device according to claim 18, further comprising an elastic member to reduce the own weight of the heating roller.

20. The belt skew correcting device according to claim 19, wherein the elastic member biases a shaft holder fixed to a heating roller shaft in an upward direction of a guide holding member.

* * * * *